May 2, 1961
E. MEYER-HARTWIG
2,982,014
PROCESS OF MANUFACTURING CERAMIC COMPOUNDS AND
METALLIC CERAMIC COMPOUNDS
Filed May 20, 1955
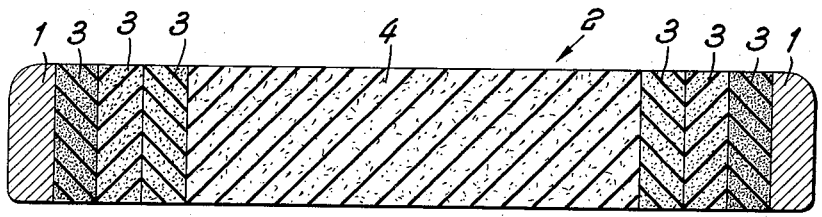
Fig. 1
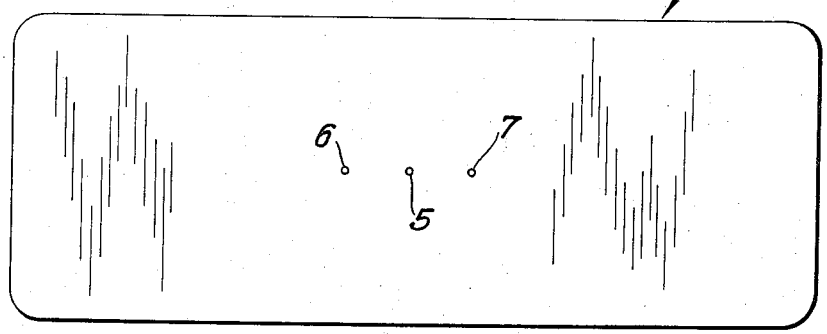
Fig. 2
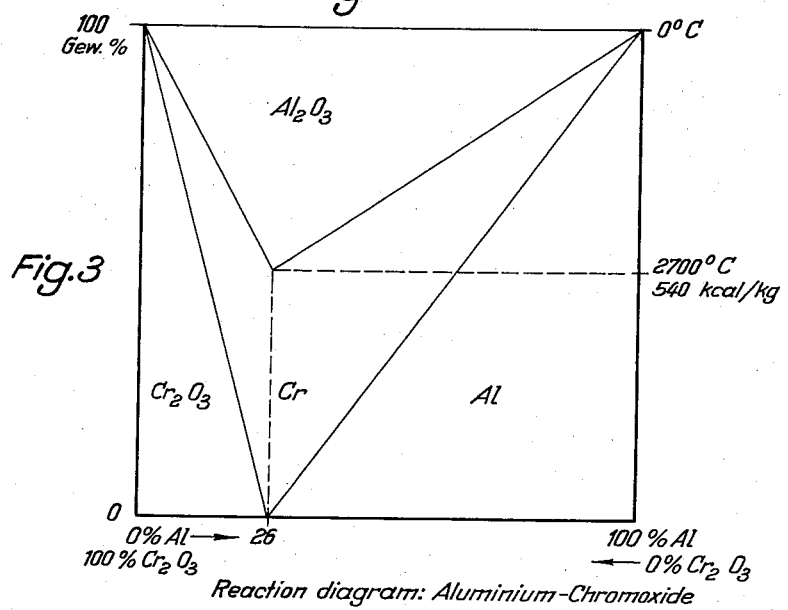
Reaction diagram: Aluminium-Chromoxide
Inventor:
E. Meyer-Hartwig
by Mason, Porter, Miller & Stewart
Attorneys

United States Patent Office 2,982,014
Patented May 2, 1961

2,982,014
PROCESS OF MANUFACTURING CERAMIC COMPOUNDS AND METALLIC CERAMIC COMPOUNDS

Eberhard Meyer-Hartwig, Aachen-Mulartshutte, Germany

Filed May 20, 1955, Ser. No. 509,973

11 Claims. (Cl. 29—182.5)

The invention relates to a process of manufacturing ceramic compounds and metallic ceramic compounds in particular.

According to the processes of manufacturing ceramic compounds hitherto known, the powders employed for the manufacture of ceramic bodies are dressed or prepared, then compressed by application of pressure or by use of a binder and finally hardened by a heat treatment. The compressed bodies are heated in furnaces operated with gas, electricity or coal until the required sintering temperature is reached, that is, the compressed bodies are subjected to external heat. In case of metallic ceramic compounds, the bodies can be heated internally by electric current as such ceramics are conductors of electricity. The last mentioned method is customary when molybdenum is employed as metal. The internal heating has the advantage that it does not require furnaces and that heat is saved.

So-called mixed or metallic ceramic compounds, that is, sintered compounds composed of a mixture of metal powder and metal oxide are manufactured in a similar manner.

The inventor has found that with mixed or metallic ceramics the required increase in temperature can be obtained by employing powders reacting exothermically with each other. The use of exothermically reacting powders is particularly advantageous for the sintering process proper as the diffusion during the reaction results in a strong bonding between the metallic and non-metallic particles.

Sintering by reaction has still other advantages. Normally, the sintering process including heating and cooling requires several hours while only a few minutes are necessary when, according to the invention, exothermically reacting powders are used. As a mixture of metal powders with ceramic powders results in compounds insensitive to varying temperatures, an abrupt change of temperature during the heating and cooling periods has no adverse effect. The brief period during which the material remains in the furnace has several additional advantages. The oxygen that is present in the furnace, unless a protective gas is employed, penetrates only slightly into the surface and even tends to harden the surface, while the use of a protective gas is imperative when the material remains in the furnace for the conventional long period of time, at least when it is desired that the finished product contain a metallic component.

In the event of a definite metallic content being required in the finished product, such definite metal content can be attained by controlling the reaction according to the analysis of the raw material when the process is carried out in the presence of a protective gas. However, when it is intended to manufacture a pure or predominantly ceramic body, care must be taken that sufficient oxygen is present within the furnace to convert all the metal contained in the raw material into metal oxide. The oxygen required can be provided by circulating fresh air or oxygen-containing gases or vapors through the furnace. This possibility is of great importance as there are many instances in which an increase in temperature in the furnace proper is either uneconomical or even impossible. The process according to the invention enables very high temperatures to be attained without requiring expensive furnaces.

The previously mentioned possibility of increasing the temperature without employing expensive equipment is essential in instances where it is desired to produce ceramic parts in a simple manner, for instance in laboratories. In this case a suitably selected reacting raw material is mixed with a quick-evaporating liquid such as alcohol. The pastelike mixture thus formed is then shaped or used as cement. It is heated by means of an ordinary furnace having a comparatively low temperature or by a soldering torch and ignited by a hot wire. The cement will then bond or weld the particles of the material together. This method also permits coating of metals for the purpose of electric or thermic insulation. Particularly advantageous results are obtained when the material to be coated is made to react with the cement.

In certain instances the shaped body will tend to deform during the reaction sintering, by reason of melting. To avoid such deformation it is advisable to carry out the reaction within a range of temperature below the temperature above which the shaped body tends to deform.

The process of reaction can be controlled by selecting a suitable ratio of the mixed raw materials or by adding a certain percentage of a filling material which either reacts endothermically or does not react at all. As will be apparent, a process according to the invention also permits the development of sintered compounds containing a plurality of different materials.

In certain instances, the powders used as raw materials cannot be compressed sufficiently to form compressed bodies substantially free from pores by the application of economically practical pressures. However, such more or less porous compressed bodies are desirable for certain applications. Furthermore, a practically solid finished product can be obtained by a suitable control of the sintering process. It is also possible to produce practically solid bodies by means of reaction sintering when the pores of a ceramic body are saturated with a liquid metal either instead of or together with the addition of metal powder.

For certain applications mixed ceramic compounds containing zones of different composition are required. The production of ceramic bodies of this type causes difficulties when the sintering temperatures of the metal and of the ceramic do not coincide. The metal may become liquid at the sintering temperature of the ceramic or the ceramic will not become sufficiently hardened at the sintering temperature of the metal. As a result, the manufacturing processes hitherto known require complicated and expensive furnaces to produce useful compounds from materials having different sintering zones. The reaction sintering according to the invention permits the production of stable and solid bodies even though the ceramic component requires higher sintering temperatures than the metal. This is due to the fact that the different components of the mixture cause higher temperatures during the reaction only at the desired portions of the body.

The following examples will explain the principle of the invention in greater detail.

(1) *General.*—Extensive tests showed that useful solid materials can be obtained by applying the following process: Iron oxide powder is mixed with magnesium powder. At the reaction temperature of magnesium oxide the two materials can be reacted with each other, that is, the iron will release its oxygen to the magnesium, According to the selected proportions of the mixture, an iron-magnesium oxide is formed either pure or containing different proportions of iron oxide or magnesium. The products are very strong and solid and possess valuable properties as to strength, stress-resisting, etc. Furthermore, they are insensitive to changes in temperature.

(2) *Oxide-ceramic.*—Aluminum powder is mixed with titanium oxide and then sintered after the usual preparation. As high temperatures which are developed when practical proportions of the mixed materials are used may result in an undesirable melting of the material, about 15% or more of a material is preferably added which will not participate in the reaction, for example, titanium oxide or zirconium oxide. The tests showed that compounds thus formed possessed a resistance to bending or flexing of more than 12 kg./mm.$^2$ and allowed substantial extension.

It was further found that the resistance to changes in temperature is considerable and also the strength at high temperatures. The compound produced remained solid and useful at temperatures up to about 2,000° C.

(3) *Cement.*—A mixture of aluminum powder and titanium oxide was formed and then plasticized by the addition of alcohol. After drying and shaping the mixture was heated up to 500° C. and then heated with a suitable hot wire. The paste previously described also permits the coating of sheet metal. For this purpose an aluminum sheet, for example, is covered with the paste, then the sheet and the paste are heated after having been dried and thereupon the paste is ignited. The coating thus formed is substantially insensitive to changes in temperature and strongly bonded to the surface of the aluminum sheet.

(4) *Saturation.*—The proportion of the metallic and ceramic components of the material to be reacted is selected according to the desired properties of the finished product to be produced. The ceramic body is then subjected to a preliminary sintering so controlled that the pores present in the body are sufficient to receive the desired quantity of metal. The metal—in liquid state—is caused to penetrate into the pores either by placing the ceramic body in a vacuum or by application of pressure. The shaped body thus formed is practically free from pores, the reaction taking place without difficulty by reason of the available large surfaces. It was found that the products thus produced possess very great strength.

(5) *Bodies containing zones of different composition.*—In certain instances it is desirable to produce a body containing zones in which the content of metal gradually increases from zone to zone until certain zones contain practically pure metal. The latter zones can be used to connect the body in an electric circuit. Bodies of this type can be advantageously used as heating elements of electric heaters.

In the accompanying drawings a heating element, manufactured according to the invention, is shown by way of example and the invention is not limited thereto.

Fig. 1 is a sectional view of the heating element;

Fig. 2 illustrates a means for manufacturing the heating element shown in Fig. 1, and Fig. 3 shows a reaction diagram for chromium oxide and aluminum.

In the heating element according to Fig. 1, the sections 1 of the element, which bears the general designation 2, constitute zones composed of pure metal or containing a substantial proportion of metal. These zones serve to connect the heating element in a suitable electric circuit. The zones 3 represent zones in which the content of oxide gradually increases from zone to zone and section 4 of the heating element is a homogeneous portion containing metal and metal oxide. The zones 3 and 4 are composed of mixtures which will produce the desired temperatures. The reactions of these zones can be effected by either heating the entire element or by local heating. As previously mentioned, the mixture to be reacted can be ignited by means of a hot wire. This ignition wire can be embedded in the mixture. The increased electric resistance of the metal components of the body will then ignite the wire when the heating element is connected up in an electric circuit. According to Fig. 2 an ignition wire 5 is embedded in the heating element 2 and can be connected up in an electric circuit at the points 6 and 7.

*Manufacture of ceramic bodies according to Examples 2 and 4*

Aluminum powder having a grain size of 0.035 mm. or less is mixed with TiO$_2$ having the same grain size in a weight ratio of 1 to 3. For the purpose of reducing the temperature of the reaction, one weight part of precipitated Al$_2$O$_3$ is added. To improve the effect of the subsequent compression 3% of oil is added to the mixture which is then compressed by the application of a pressure of one ton per cm.$^2$. Thereupon the compressed body is heated for about 10 minutes up to a temperature of 900° C. At this temperature the reaction begins and, in the case of a body having a diameter of about 10 mms. and a length of about 50 mms., is completed in about one minute. The temperature within the reaction zone increases to about 1,600° C. during sintering in air. The finished product contains a small percentage of titanium after sintering in air.

Instead of aluminium powder, liquid aluminium can be used for the Example 4. In this case titanium oxide having a grain size of 0.035 mm. or less is mixed with Al$_2$O$_3$ in a ratio by weight of 1 to 3. Then a compressed body is formed the pores of which constitute 50% of its total volume. This body is sintered at about 900° C., thereby reducing the volume occupied by the pores to about 30%. After filling the pores with liquid aluminium in a vacuum, the body is heated to about 900° C. The strength of such body is substantially greater than the strength of a body manufactured by employing powder, due to the few remaining pores. Furthermore, a body manufactured with liquid metal will retain its configuration more accurately.

Pure oxides such as aluminium oxide and magnesium oxide possess a high resistance to temperature but a very low resistance to changes in temperature. As can be seen from the foregoing description, the resistance of pure oxides to changes in temperature can be greatly increased by mixing the oxides with metals and causing the reactions described to take place.

Materials obtained by the process according to the invention can be advantageously used as linings for furnaces, pipes for furnaces employing high temperatures, heat exchangers for gas turbines and for many other purposes where the material is subjected to rapidly changing high temperatures. For example, the material can be used for linings of turbine chambers or for nozzles of turbines.

The material can also be used for the manufacture of machines such as acid-proof pumps, if the metal content of the material is increased.

The principle of the invention is further explained with the aid of the graph shown in Fig. 3. For mixtures of aluminium and chromium oxide the weight percentages of aluminium and residue of chromium oxide are indicated on the abscissa of the diagram. The stoichiometrical ratio of the reaction is taken at 26%. At 26% the whole of the chromium oxide reacts to form chromium and the whole of the aluminium to form aluminium oxide. 50% chromium oxide and 50% aluminium oxide are produced. If the same measurement is marked off on the ordinate as on the abscissa and a square is drawn, the weight percentages of the chrome produced can be marked on the ordinate beyond the stoichiometric point and, as has been done in the drawing, the actual 100% points—that is the corner points of the square—can be connected. In this manner a graph is produced wherein the reaction ratios for any desired mixture can be read, providing the specific gravities remain constant.

As moreover the aluminium oxide produced is the determining factor for the reaction temperature, the heat effect can be calculated in the case of a 100% reaction. The aluminium oxide line corresponds to the heat effect providing the temperature is independent of the specific heat.

Reaction processes are known with slight temperature increase based on mixtures of two metal components, the heat effect of which is relatively low (mixed crystal formations, intermetal compounds, alloying formations). These processes occur in all sintering operations but are not the determining factor for the increase in temperature during the sintering operation.

I claim:

1. Process of manufacturing metallic ceramic compounds, consisting in compressing a reducible metal oxide powder so as to form a porous mass, substantially filling the pores of said mass with a liquid metal having an oxide with a lower heat of formation than the oxide powder, and subjecting to a sintering process in which the oxide changes the metal into an insoluble refractory oxide within the pores of said mass.

2. Process of manufacturing metallic ceramic compounds, consisting in mixing a reducible metal oxide powder with a metal powder having an oxide with a lower heat of formation, adding an inert filling material, heating this mixture so as to cause the oxide to change the metal into an insoluble refractory oxide, whereby a compound is formed composed of metal oxide and metal in the desired proportions.

3. Process of manufacturing metallic ceramic compounds, consisting in mixing oxygen supplying powder and a metallic powder capable of reacting exothermically with each other, the metal powder having an oxide with a higher heat of formation than the other mentioned powder to form a carrier, treating the mixture with a plasticizing agent to form a paste, coating the metallic carrier with said paste, and sintering said paste and carrier so as to effect a transfer of oxygen from the other mentioned powder to the metal powder and bonding the paste to the carrier.

4. Process as set forth in claim 3, wherein said plasticizer consists of an alcohol.

5. Process of manufacturing ceramic compounds, consisting in mixing a reducible metal oxide and metal powder having an oxide with a higher heat of formation than the oxide, shaping said mixture under pressure to form a body of the desired configuration, the proportions of metal oxide and metal in different sections of said body being individually predetermined, and subjecting said shaped body to a sintering process in which the oxide releases its oxygen to the metal.

6. A ceramic compound composed of metal powder and a reducible metal oxide powder exothermically reacted with each other by a sintering process in which the oxide has converted the metal powder into an insoluble refractory oxide.

7. A ceramic compound composed of metal powder and a reducible metal oxide powder exothermically reacted with each other in the presence of an inert filling material, by a sintering process in which the oxygen of the oxide has converted the metal powder into an insoluble refractory oxide.

8. A ceramic body composed of metal powder and a reducible metal oxide powder exothermically reacted with each other by a sintering process in which the oxygen of the oxide has converted the metal powder into an insoluble refractory oxide, the proportions of metal powder and metal oxide in different sections of said body varying according to a predetermined ratio.

9. A ceramic body as set forth in claim 8, wherein the proportions of metal powder and metal oxide powder in the different sections of said body vary progressively from substantially pure metal powder to substantially pure metal oxide powder.

10. The process for the production of ceramic compounds consisting of mixing an initial metallic oxide with a metal the oxide of which has a higher heat of formation than that of the metallic oxide and sintering the mass to oxidize the metal by the exothermic reaction with the initial oxide.

11. The process of manufacturing ceramic compounds which consists in compressing mixed titanium oxide and alumina, sintering, filling the pores with molten aluminum in vacuum, and heating.

References Cited in the file of this patent

UNITED STATES PATENTS

| | | |
|---|---|---|
| 979,363 | Arsem | Dec. 20, 1910 |
| 1,602,542 | Marden | Oct. 12, 1926 |
| 1,911,189 | Harris | May 30, 1933 |
| 2,234,245 | Groombridge et al. | Mar. 11, 1941 |
| 2,271,960 | Taylor | Feb. 3, 1942 |
| 2,294,756 | Inutsuka et al. | Sept. 1, 1942 |
| 2,744,011 | Samuel et al. | May 1, 1956 |
| 2,798,808 | Iredell et al. | July 9, 1957 |
| 2,848,324 | Krapf | Aug. 19, 1958 |

FOREIGN PATENTS

| | | |
|---|---|---|
| 922,278 | Germany | Jan. 13, 1955 |